United States Patent
Torii

(10) Patent No.: US 9,200,669 B2
(45) Date of Patent: Dec. 1, 2015

(54) WHEEL BEARING AND A WHEEL BEARING APPARATUS HAVING THE WHEEL BEARING

(75) Inventor: Akira Torii, Iwata (JP)

(73) Assignee: NTN Corporation, Osaka-shi (JP)

( * ) Notice: Subject to any disclaimer, the term of this patent is extended or adjusted under 35 U.S.C. 154(b) by 469 days.

(21) Appl. No.: 12/572,513

(22) Filed: Oct. 2, 2009

(65) Prior Publication Data

US 2010/0021099 A1    Jan. 28, 2010

Related U.S. Application Data

(63) Continuation of application No. PCT/JP2008/000640, filed on Mar. 18, 2008.

(30) Foreign Application Priority Data

| Apr. 4, 2007 | (JP) | 2007-098304 |
| Apr. 4, 2007 | (JP) | 2007-098305 |
| Apr. 4, 2007 | (JP) | 2007-098306 |
| Apr. 4, 2007 | (JP) | 2007-098307 |
| Aug. 29, 2007 | (JP) | 2007-221959 |

(51) Int. Cl.
*B60B 27/00* (2006.01)
*F16C 19/18* (2006.01)
(Continued)

(52) U.S. Cl.
CPC ........... *F16C 19/184* (2013.01); *B60B 27/0005* (2013.01); *B60B 27/0042* (2013.01);
(Continued)

(58) Field of Classification Search
CPC .... F16C 19/184; F16C 33/64; F16C 33/7883; F16C 33/7879; F16C 33/588; F16C 2326/02; B60B 27/0005; B60B 27/0042; B60B 27/0073; Y02T 10/86

USPC ........ 384/544, 589, 477, 478, 484, 486, 513, 384/516, 515
See application file for complete search history.

(56) References Cited

U.S. PATENT DOCUMENTS 4,174,764 A * 11/1979 Mutschler et al. ............... 180/78
4,278,307 A * 7/1981 Olschewski et al. .......... 384/526
(Continued)

FOREIGN PATENT DOCUMENTS

| DE | 103 31 180 | 2/2005 |
| EP | 0 328 496 | 1/1996 |

(Continued)

*Primary Examiner* — Alan B Waits
(74) *Attorney, Agent, or Firm* — Harness, Dickey & Pierce, P.L.C.

(57) ABSTRACT

A vehicle wheel bearing forming a double row angular contact ball bearing of back-to-back duplex bearing type has an outer member formed, on its inner circumference, with outer raceway surfaces with each having a circular arc longitudinal section. A pair of inner rings are each formed, on its outer circumference, with an inner raceway surface having a circular arc longitudinal section arranged opposite to one of the outer raceway surfaces. The end of a smaller diameter side of one inner ring abuts against an end of a smaller diameter side of the other inner ring. Double row balls are contained between the outer and inner raceway surfaces, respectively, of the outer member and inner rings and are held by cages. Seals are mounted in annular openings formed between the outer member and inner rings. The outer member and the inner rings are made by plastically deforming pipe members, The outer and inner raceway surfaces, cylindrical portions of the outer member forming fitting portions of the seals and/or shoulder portions of the inner rings forming land portions are formed with predetermined dimensions and are ground for accuracy.

17 Claims, 9 Drawing Sheets

(51) Int. Cl.
*F16C 33/64* (2006.01)
*F16C 33/78* (2006.01)
*F16C 33/58* (2006.01)

(52) U.S. Cl.
CPC ........... *B60B27/0073* (2013.01); *F16C 33/588* (2013.01); *F16C 33/64* (2013.01); *F16C 33/7876* (2013.01); *F16C 33/7879* (2013.01); *F16C 33/7883* (2013.01); *F16C 2326/02* (2013.01); *Y02T 10/86* (2013.01)

(56) References Cited

U.S. PATENT DOCUMENTS

| | | | | |
|---|---|---|---|---|
| 5,051,004 | A * | 9/1991 | Takeuchi et al. | 384/516 |
| 5,325,586 | A | 7/1994 | Andersson | |
| 5,775,819 | A * | 7/1998 | Kinney et al. | 384/544 |
| 5,951,173 | A * | 9/1999 | Matsui et al. | 384/513 |
| 6,357,925 | B2 * | 3/2002 | Tajima et al. | 384/544 |
| 6,702,085 | B1 * | 3/2004 | Ponson | 192/98 |
| 6,880,247 | B2 * | 4/2005 | Toda et al. | 29/898.062 |
| 7,648,283 | B2 * | 1/2010 | Komori | 384/513 |
| 2001/0007600 | A1 * | 7/2001 | Tajima et al. | 384/544 |
| 2004/0105603 | A1 * | 6/2004 | Ohtsuki et al. | 384/448 |
| 2006/0171624 | A1 | 8/2006 | Niebling et al. | |
| 2009/0129715 | A1 * | 5/2009 | Fukumura et al. | 384/537 |

FOREIGN PATENT DOCUMENTS

| | | | | | |
|---|---|---|---|---|---|
| GB | 2058243 | A * | 4/1981 | | F16C 19/16 |
| JP | 01-210612 | | 8/1989 | | |
| JP | 6-1835 | | 1/1994 | | |
| JP | 2003-130060 | | 5/2003 | | |
| JP | 2003-246203 | | 9/2003 | | |
| JP | 2006-528326 | | 9/2003 | | |
| JP | 2004-183828 | | 7/2004 | | |
| JP | 2004245260 | A * | 9/2004 | | F16C 27/06 |
| JP | 2005-325903 | | 11/2005 | | |
| JP | 2007-051665 | | 3/2007 | | |
| JP | 2007-085371 | | 4/2007 | | |
| WO | WO2005/008085 | | 1/2005 | | |
| WO | WO2007/034819 | | 3/2007 | | |
| WO | WO 2007034819 | A1 * | 3/2007 | | F16C 19/18 |

* cited by examiner (a)  (b)

(a)

(b)

(a)

(b)

(a)   (b)

(a)   (b)

WHEEL BEARING AND A WHEEL BEARING APPARATUS HAVING THE WHEEL BEARING

CROSS-REFERENCE TO RELATED APPLICATIONS

This application is a continuation of International Application No. PCT/JP2008/000640, filed Mar. 18, 2008, which claims priority to Japanese Application Nos. 2007-098304, filed Apr. 4, 2007; 2007-098305, filed Apr. 4, 2007; 2007-098306, filed Apr. 4, 2007; 2007-098307, filed Apr. 4, 2007; and 2007-221959, filed Aug. 29, 2007. The disclosures of the above applications are incorporated herein by reference.

FIELD

The present disclosure relates to a wheel bearing that freely rotatably supports a wheel of vehicle such as an automobile and, more particularly, to a wheel bearing and a wheel bearing apparatus with the wheel bearing intended to reduce its weight, size as well as manufacturing cost to improve the durability of the bearing.

BACKGROUND

Wheel bearing apparatus that freely rotationally supports a wheel of a vehicle includes a wheel hub to mount the wheel via a double row rolling bearing. There are apparatus for both driving wheels and driven wheels. For structural reasons, an inner ring rotation type is used for the driving wheels and both the inner ring rotation type and the outer member rotation type are used for the driven wheels. There are four generation types of wheel bearing apparatus. A first generation type has a wheel bearing that includes a double row angular contact ball bearing etc. fit between a knuckle, forming part of a suspension apparatus, and a wheel hub. A second generation type has a body mounting flange or a wheel mounting flange directly formed on the outer circumference of an outer member. A third generation type has one inner raceway surface directly formed on the outer circumference of a wheel hub. A fourth generation type has an inner raceway surfaces formed on the outer circumferences, respectively, of a wheel hub and an outer joint member.

Angular contact ball bearings are known that included an inner ring and an outer ring (outer member) formed by pressing a steel plate. For example, FIG. 11 shows an angular contact ball bearing 50 used in a magnetic hard disc device. An outer ring 51 and a pair of inner rings 52, 53 are formed from stainless steel by a pressing or rolling process.

The outer ring 51 is formed at substantially its axially central portion with an annular projection 51a projecting radially inward from its inner circumference. Outer raceway surfaces 51b, 51c are formed at either side of the annular projection 51a. The outer ring 51 is fit into an aperture of a housing 54 and is axially positioned with a flange 51d, formed at its one end, abutted against the end face of the housing 54. An annular recess 51e is formed on the outer circumference of the outer ring 51 by the void left by forming the annular projection 51a on the inner circumference of the outer ring 51. The annular recess is filled with adhesive to secure the outer ring 51 in the aperture of the housing 54.

On the other hand, the inner rings 52, 53 are fit into the outer ring 51. Axially outer ends of the inner rings 52, 53 are formed with curved shoulders 52a, 53a, respectively. The curved shoulders 52a, 53a are formed with inner raceway surfaces 52b, 53b, respectively. Double row balls 56, 56 are arranged between the inner raceway surfaces 52b, 53b, of the inner rings 52, 53 and the double row outer raceway surface 51b, 51c, of the outer ring 51. The balls 56, 56 are held by cages 57, 57 in each row.

Fitting portions 52c, 53c, clearance-fit onto a shaft member 55, are formed on the inner circumferences of the inner rings 52, 53, respectively. After the inner rings 52, 53 have been clearance-fit onto the shaft member 55, a cylindrical weight 59, with a constant weight, is laid on the curved shoulder portion 52a of one inner ring 52. The curved shoulder portion 53a of the other inner ring 53 is pressed against the flange portion 55a of the shaft member 55, via balls 56 by weight 59. Thus, a suitable pre-load is applied to the angular contact ball bearing 50.

After completion of the clearance-fit, a gap between the curved shoulder 52a of one inner ring 52 and the shaft member 55 is filled with adhesive 60. Thus, one inner ring 52 is prevented from slipping off from the shaft member 55 by the adhesive. The other inner ring 53 is prevented from slipping off from the shaft member 55 by its flange 55a. (See, Japanese Laid-open Utility Model Publication No. 1835/1994).

If the angular contact ball bearing 50 is used as a wheel bearing where the outer member 51 and the inner rings 52, 53 are formed from steel plates by a pressing process, it is necessary to mount seals in the annular openings formed between the outer ring 51 and the inner rings 52, 53. This not only increases the number of parts, but significantly modifies the structure to provide spaces for the seals. Thus, the manufacturing cost, weight and size are increased. In addition, it is difficult to have the same accuracy of components, more particularly, of each raceway surface, as that of components made a by cutting process of the prior art.

In addition, it is believed that the contact ellipse of the ball 56 tends to ride over a shoulder of the outer raceway surface 51b and get out of the bearing (so-called "riding over of shoulder"). This is caused by a moment load applied to the wheel bearing during turning of a vehicle. It is further believed that an edge load would be caused at the shoulder A by the riding over of shoulder. The term "edge load" means an excessive stress concentration caused in a corner etc. This is one phenomenon that causes a premature flaking.

During forming of the annular projection 51a, by recessing the axially central portion of the outer ring 51 during the rolling process, if the height of the annular projection 51a, from the outer raceway surface 51b is made large, it is difficult for the ball 56 to ride over the shoulder A during the turning moment when a moment load is applied to the bearing. However, in such a case, it is believed that the wall thickness at a transition portion B between the outer circumference and the annular recess 51e would be thinned depending on the radius of curvature R. Thus, cracks would be caused in the shoulder portion A when the height of shoulder is large. It will be appreciated that the generation of cracks will be prevented by suppressing the drawing ratio while increasing the number of machining steps. This not only increases the manufacturing costs but reduces the manufacturing accuracy and makes it difficult to assure a desirable bearing accuracy.

SUMMARY

It is, therefore, an object of the present disclosure to provide a wheel bearing and a wheel bearing apparatus with the wheel bearing for a vehicle that reduces the manufacturing cost, the weight and size and improves sealability and accuracy. It is another object to improve the durability of the wheel bearing.

To achieve the objects, a vehicle wheel bearing is formed with a double row angular contact ball bearing of back-to-back duplex bearing type. An outer member is formed, on its inner circumference, with outer raceway surfaces. Each outer raceway surface has a circular arc longitudinal section. A pair of inner rings is formed, on its outer circumference, with an inner raceway surface. The inner raceway surfaces have a circular arc longitudinal section arranged opposite to one of the outer raceway surfaces. The end of a smaller diameter side of one inner ring is abutted against the end of a smaller diameter side of the other inner ring. Double row balls are contained between the outer and inner raceway surfaces, respectively, of the outer member and inner rings. The balls are held by cages. Seals are mounted in annular openings formed between the outer member and inner rings. The outer member and the inner rings are made by plastically deforming pipe members. The outer and inner raceway surfaces, cylindrical portions of the outer member forming fitting portions of the seals and/or shoulder portions of the inner rings forming land portions are ground to have predetermined dimensions and accuracy.

The outer member and the inner rings are made by plastically deforming pipe members. The outer and inner raceway surfaces, cylindrical portions of the outer member forming fitting portions for the seals and/or shoulder portions of the inner rings forming land portions are ground to have predetermined dimensions and accuracy. Thus, it is possible to improve the productivity and yield of the wheel bearing, to reduce manufacturing cost as well as to assure the same accuracy and sealability of the wheel bearing as those of a conventional wheel bearing.

The outer member and the inner ring are made by a cold rolling process. This makes it possible to have a substantially uniform wall thickness and to assure a predetermined accuracy in the configuration and dimensions of the wheel bearing.

The diameter of the ball is denoted by Dw. The height of an annular projection from the bottom of the outer raceway surface of the outer member is denoted by H. A ratio H/Dw is set within a range of 0.30~0.43. This makes it possible to assure a desirable bearing accuracy. Also, it prevents the generation of cracks in the shoulder of the raceway surfaces. Also, it prevents the contact ellipse of the ball from riding over the shoulder when a turning moment is applied to the bearing. Thus it is possible to provide a wheel bearing with an improved durability.

The cylindrical portions at both ends of the outer member are formed by a rolling process. The seals are fit into the cylindrical portions. A shoulder portion axially extends from a larger diameter side end of the inner ring. The shoulder portion is formed by the rolling process. Sealing lips of the seal slidably contact the surface of the shoulder of the inner ring. This provides a desirable sealability of the wheel bearing.

The seal comprises a slinger and a sealing plate. Each has a substantially L-shaped cross-section. They are arranged opposite toward each other. The sealing plate includes a side lip and radial lips. Cylindrical portions are formed at both ends of the outer member by the rolling process. The sealing plate is fit into the cylindrical portion. A shoulder portion axially extends from a larger diameter side end of the inner ring. It is formed by the rolling process. The slinger is press fit onto the shoulder. The sealing lips of the sealing plate slidably contact the surface of the slinger. This provides a further tight sealability.

Radially inwardly extending shoulder portions are formed on both ends of the outer member by the rolling process. The seals are integrally formed on the shoulders. This makes it possible to reduce the number of components and steps of assembly of the wheel bearing. Thus, this reduces the manufacturing cost.

Both end faces of the outer member and a larger diameter side end face of the inner ring are formed by a turning process after their plastic deformation process. The outer and inner raceway surfaces, the outer circumferential surface of the outer member, the inner circumferential surface and smaller diameter side end face of the inner ring are ground to have predetermined dimensions and accuracy after heat treatment. This assures the same accuracy as conventional wheel bearings.

The outer circumference of the axially central portion of the outer member is annularly recessed to form an annular projection on its inner circumference with a flat surface on the radially innermost portion of the annular projection. Shoulders that connect the outer raceway surface and the annular projection are ground to have a circular arc cross-section. A formed grinding wheel simultaneously grinds the outer raceway surface. This assures a desirable bearing accuracy and prevents the generation of cracks in the shoulder of the raceway surfaces. Furthermore, since the shoulder portion is smoothly connected to the outer raceway surface, it is possible to prevent the contact ellipse of the ball from riding over the shoulder. Thus, this prohibits the edge load when the turning moment is applied to the bearing. Accordingly, it is possible to provide a wheel bearing with improved durability.

The flat surface of the annular projection is formed by the rolling process to have a small step relative to the shoulder of the annular projection. This assures the height of shoulder of the annular projection from the outer raceway surfaces by filling the shoulder portion with blank materials. This prevents the generation of cracks at the shoulder portion during the rolling step.

The double row outer raceway surfaces are simultaneously ground by a formed grinding wheel. This makes it possible to reduce the manufacturing steps and costs. Also, it limits erroneous difference within a predetermined accuracy in groove diameters of the double row outer raceway surfaces and the pitch therebetween. Thus, this further improves the bearing accuracy.

A transition portion between the outer circumference and the annular recess of the outer member is formed with a circular arc cross-section of a predetermined radius of curvature. Also, the portion has a substantially uniform wall thickness. This makes it possible to prevent the generation of cracks in the shoulder of the raceway surfaces. Furthermore, it is also possible to prevent the contact ellipse of the ball from riding over the shoulder and thus causing an edge load when a turning moment is applied to the bearing. Accordingly, it is possible to provide a wheel bearing with improved durability. The term "substantially uniform" means uniform wall thickness of a pipe member prior to its deformation. A wall thickness is obtained after deformation without causing plastic flowing of material except for forming a circular arc cross-section in the transition portion. Accordingly, it should be understood that the term "substantially uniform" also includes conditions of slight thin and thick wall thickness caused by displacement of material during formation of the circular arc cross-section in the transition portion.

The radius of curvature R of the transition portion is set within a range of 1.5~1.8 Rw (wherein Rw is a radius of the ball). This prevents reduction of rigidity due to reduction of the wall thickness as well as reduction of productivity in a plastic deformation process due to increased wall thickness.

The cages are formed by injection molding plastic resin as a snap-on type. The balls are held by the cages and are free to roll without falling-out. Counter portions are formed by the plastic deformation process at positions opposite to the shoulders of the outer raceway surfaces. This makes it possible to prevent a ball cassette, once assembled in assembling steps, from being dropped off from the outer member. Thus, this simplifies the assembly of the wheel bearing. The term "snap-on type" means a cage of snap type that can detachably mount balls by elasticity of the synthetic resin.

The inner diameter of the counter portions is set smaller than the circumscribed circle diameter of the balls in a ball cassette where the balls are held by the cage. This makes it possible to surely prevent the ball cassette from dropping off of the outer member.

A counter portion is formed by the plastic deformation process at a position opposite to the shoulder of the inner raceway surfaces. The outer diameter of the counter portion is set larger than the inscribed circle diameter of balls in a ball cassette where the balls are held by the cage. This makes it possible to prevent the inner rings, once assembled in assembling steps, from axially dropping off. Thus, this simplifies the assembly of the wheel bearing.

The counter portions are ground by a formed grinding wheel simultaneously with the grinding of the inner raceway surfaces after heat treatment. This makes it possible to further finely finish the inner circumference of the counter portion while eliminating deformation caused by heat treatment. This suppresses the generation of scratches on balls that would be caused by passage of balls through the counter portion. It provides a wheel bearing with high quality and reliability.

According to another aspect, a wheel bearing apparatus comprises a wheel hub integrally formed at one end with a wheel mounting flange. A cylindrical portion axially extends from the wheel mounting flange, via a shoulder portion. An above wheel bearing is press fit onto the cylindrical portion of the wheel hub, via a predetermined interference. An outer joint member of a constant velocity universal joint is fit into the wheel hub, via serration engagement therebetween. A pair of inner rings are sandwiched between the shoulder portion of the wheel hub and a shoulder portion of the outer joint member and a predetermined bearing pre-pressure is applied.

The wheel bearing apparatus of a first generation type comprises a wheel hub integrally formed at one end with a wheel mounting flange. A cylindrical portion axially extends from the wheel mounting flange, via a shoulder portion. A wheel bearing is press fit onto the cylindrical portion of the wheel hub, via a predetermined interference. An outer joint member of a constant velocity universal joint is fit into the wheel hub via a serration engagement therebetween. A pair of inner rings is sandwiched between the shoulder portion of the wheel hub and a shoulder portion of the outer joint member. A predetermined bearing pre-pressure is applied. Thus, it is possible to increase the rigidity of the bearing and thus to improve the rolling fatigue life of the bearing.

The vehicle wheel bearing comprises an outer member formed on its inner circumference, with outer raceway surfaces. Each outer raceway surface has a circular arc longitudinal section. A pair of inner rings is formed, on its outer circumference, with an inner raceway surface with a circular arc longitudinal section arranged opposite to one of the outer raceway surfaces. The end of a smaller diameter side of one inner ring abuts against the end of a smaller diameter side of the other inner ring. Double row balls are contained between the outer and inner raceway surfaces, respectively, of the outer member and inner rings. The balls are held by cages. Seals are mounted in annular openings formed between the outer member and inner rings. The outer member and the inner rings are made by plastically deforming pipe members. The outer and inner raceway surfaces, cylindrical portions of the outer member forming fitting portions of the seals and/or shoulder portions of the inner rings forming land portions are ground to have predetermined dimensions and accuracy. Thus, it is possible to improve the productivity and yield of the wheel bearing, to reduce the manufacturing cost as well as to assure accuracy and sealability of the wheel bearing as those of the conventional wheel bearing.

A vehicle wheel bearing forming a double row angular contact ball bearing of a back-to-back duplex bearing type comprises an outer member formed, on its inner circumference, with outer raceway surfaces. Each outer raceway surface has a circular arc longitudinal section. A pair of inner rings is each formed, on their outer circumference, with an inner raceway surface having a circular arc longitudinal section that is arranged opposite to one of the outer raceway surfaces. The end of the smaller diameter side of one inner ring abuts against the end of the smaller diameter side of the other inner ring. Double row balls are contained between the outer and inner raceway surfaces respectively of the outer member and inner rings. The balls are held by cages. Seals are mounted in annular openings formed between the outer member and inner rings. The outer member and the inner rings are made by rolling pipe members. The seals are fit into the cylindrical ends of the outer member. An axially extending shoulder portion is formed on the larger diameter end of the inner ring. The sealing lips of the seal slidably contact the shoulder portion. The outer and inner raceway surfaces, the fitting surfaces and seal land portions of the seals are ground to have predetermined dimensions and accuracy.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Preferable embodiments of the present disclosure will be hereinafter described with reference to the drawings.

Figure 1:
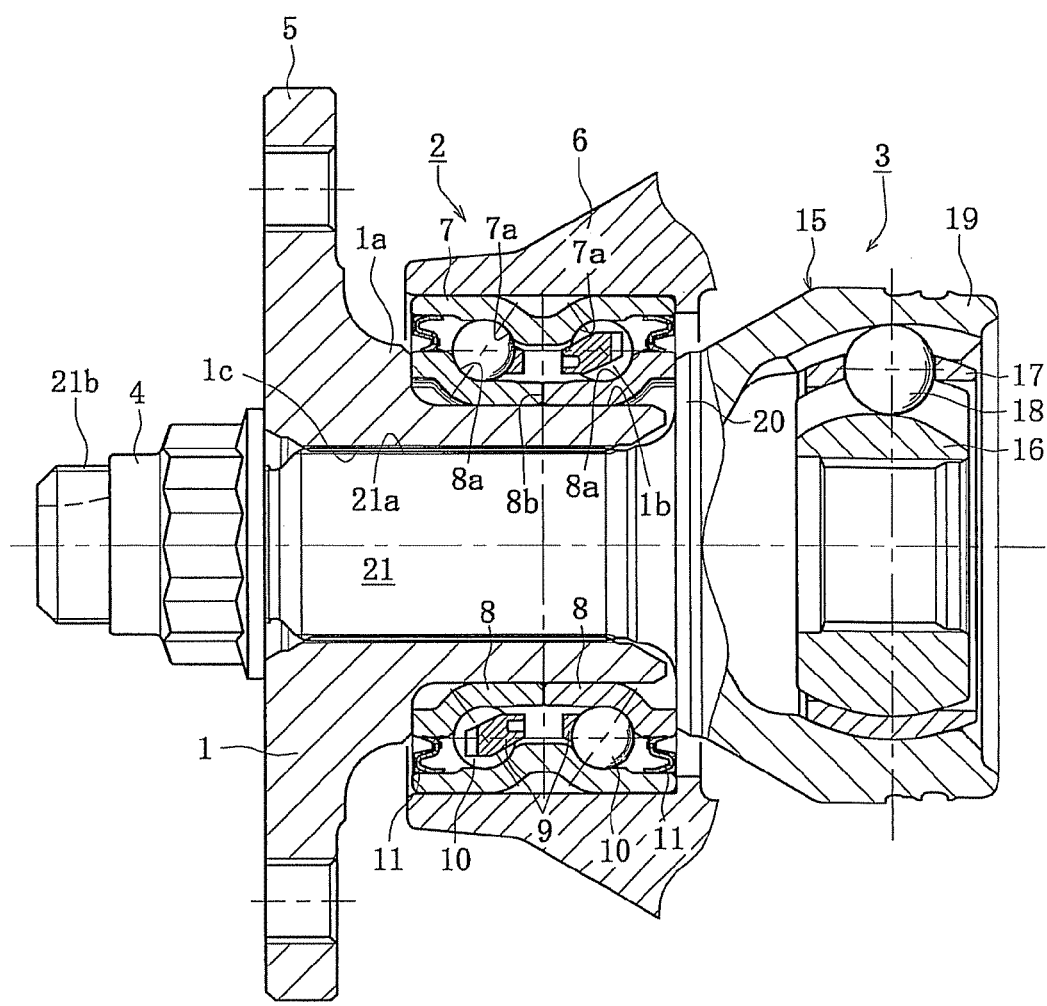
FIG. 1 is a longitudinal section view of a first embodiment of a vehicle wheel bearing apparatus.
Figure 2:
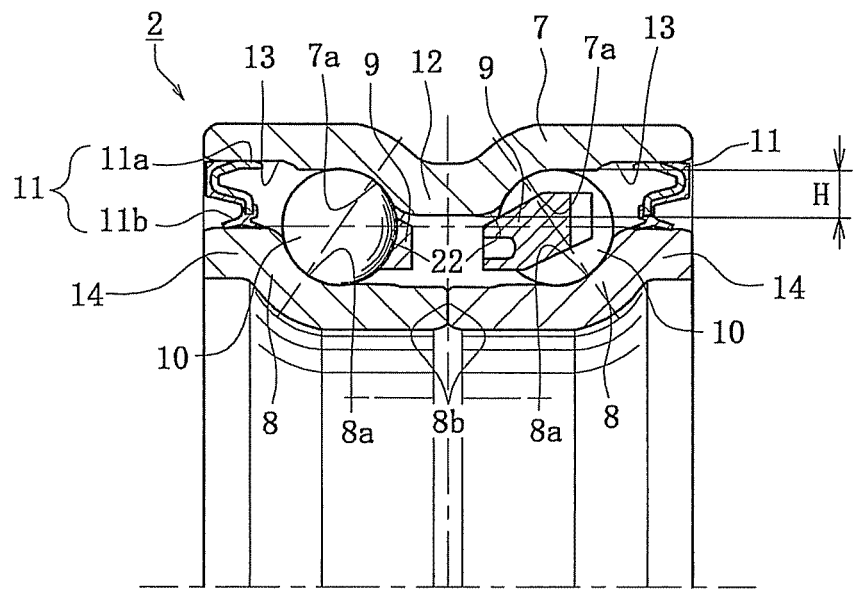
FIG. 2 is a partially enlarged view of wheel bearing of FIG. 1.
Figure 3:
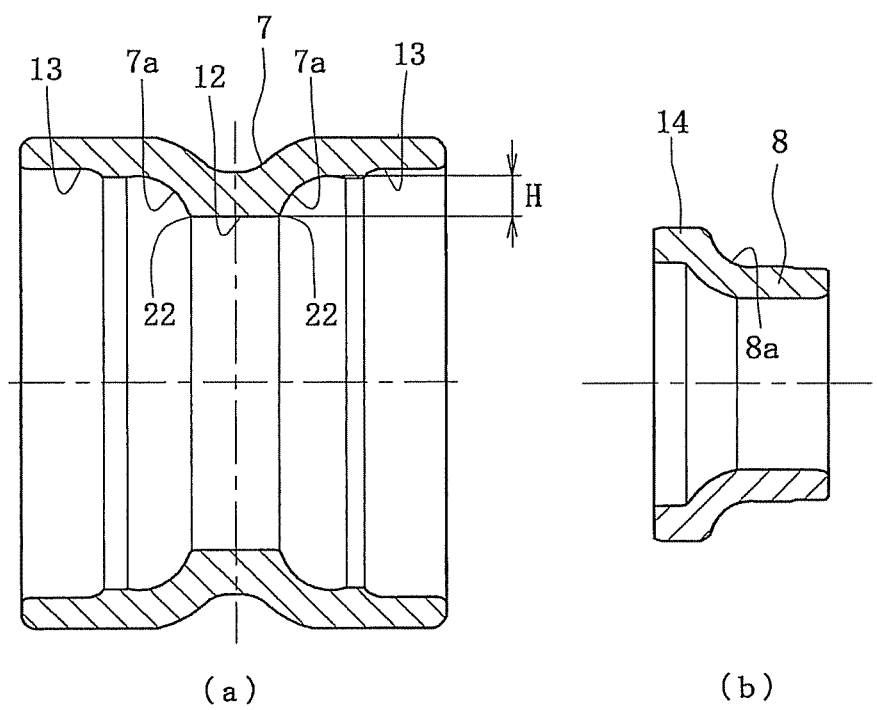
FIG. 3(a) is a longitudinal section view of an outer ring only of FIG. 2.
FIG. 3(b) is a longitudinal section view of an inner ring only.
Figure 4:
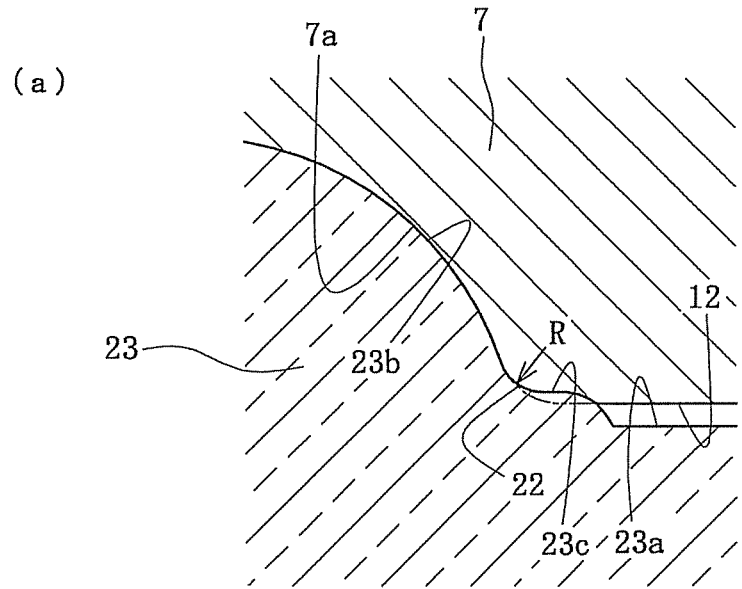
FIG. 4(a) is an explanatory view of a grinding process of the outer member.
FIG. 4(b) is an explanatory view of a modification of FIG. 4(a).
Figure 4:
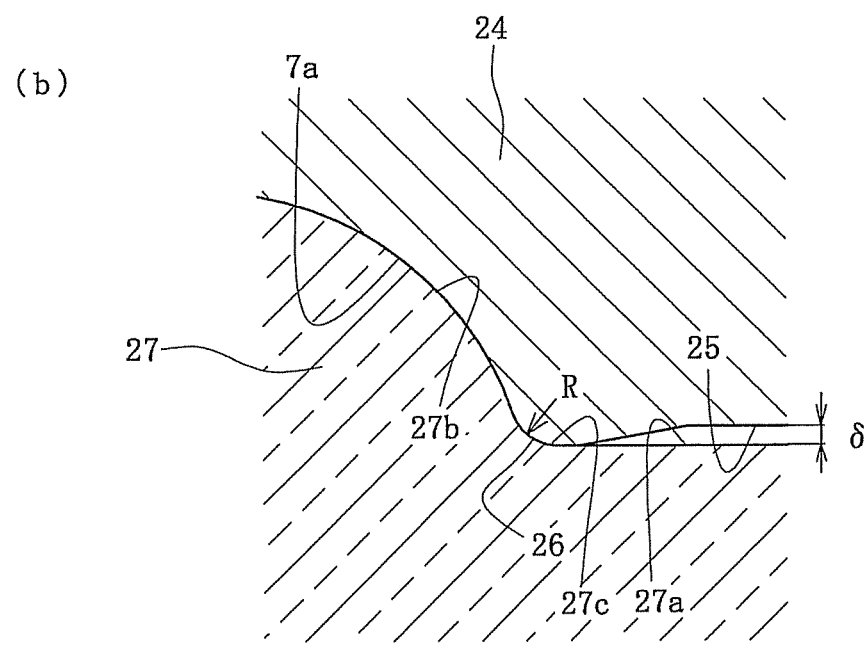

FIG. 1 is a longitudinal section view of a first embodiment of a vehicle wheel bearing apparatus. FIG. 2 is a partially enlarged view of wheel bearing of FIG. 1. FIG. 3(a) is a longitudinal section view of an outer ring only of FIG. 2. FIG. 3(b) is a longitudinal section view of an inner ring only of FIG. 2. FIG. 4(a) is an explanatory view of a grinding process of the outer member. FIG. 4(b) is an explanatory view of a modification of FIG. 4(a).

In descriptions below, the term "outer-side" defines a side that is positioned outside of a vehicle body (left-hand side of FIG. 1). The term "inner-side" defines a side that is positioned inside of a vehicle body (right-hand side of FIG. 1) when the bearing apparatus is mounted on the vehicle body.

The wheel bearing apparatus of FIG. 1 is formed as a structure of the first generation type. A wheel hub 1 has a wheel bearing 2 mounted on the wheel hub 1. A constant velocity universal joint 3 is fit into the wheel hub 1 so that torque can be transmitted between the two. The wheel hub and constant velocity joint are separably secured by a securing nut 4.

The wheel hub 1 is integrally formed with a wheel mounting flange 5 at its outer side end. A cylindrical portion 1b axially extends from the wheel mounting flange 5 via a shoulder portion 1a. A serration (or spline) 1c, for torque transmission, is also formed on the inner circumference of the wheel hub 1. The wheel hub 1 is made of medium carbon steel including carbon of 0.40-0.80% by weight such as S53C and forged. The wheel hub 1 may be hardened in a region from the shoulder portion 1a to the cylindrical portion 1b, after forging, by thermal refining or by high frequency induction quenching to have a surface hardness of 58-64 HRC. This increases the fatigue strength against bending.

The wheel bearing 2 is fit into a knuckle 6. It comprises, as shown in FIG. 2, an outer member (outer ring) 7 formed with double row outer raceway surfaces 7a, 7a on its inner circumference. A pair of inner rings 8, 8, formed with double row inner raceway surfaces 8a, 8a on their outer circumference, is adapted to be arranged opposite to the outer raceway surfaces 7a, 7a. Double row balls 10, 10 are freely rollably held by cages 9, 9 between the outer and inner raceway surfaces 7a, 7a and 8a, 8a. Seals 11 are mounted on both ends of the outer member 7. The inner rings 8, 8 are arranged with their smaller diameter end faces 8b, 8b abutting one another to form an angular contact ball bearing of a so-called back-to-back duplex bearing type.

Each seal 11 includes a metal core 11a adapted to be fit into the cylindrical portion 13 of the outer member 7. An elastomeric sealing member 11b, such as nitrile rubber, is adhered to the metal core 11a, via vulcanized adhesion. The sealing member 11b has a pair of radial lips. Thus, it is possible to effectively prevent leakage of lubricating grease sealed within the wheel bearing. Additionally, it prevents the penetration of rain water or dusts from the outside of the bearing apparatus. It may be possible to use a so-called pack seal where a slinger is press-fit onto the inner ring 8. A sealing member is arranged on the cylindrical portion 13 of the outer member 7 opposite to the slinger so that sealing lips of the sealing member slidably contact the slinger.

The constant velocity universal joint 3 includes an outer joint member 15, a joint inner ring 16, a cage 17, and torque transmitting balls 18 as shown in FIG. 1. The outer joint member 15 includes a cup-shaped mouth portion 19, a shoulder portion 20 forming the bottom of the mouth portion 19, and a shaft portion 21 axially extending from the shoulder portion 20. The shaft portion 21 of the outer joint member 15 is formed with serration 21a to engage the serration 1c of the wheel hub 1. A male thread 21b is formed on the end of the shaft portion 21. The outer joint member 15 is fit into the wheel hub 1, via serrations 1c, 21a, until the shoulder portion 20 abuts the larger end face of the inner ring 8. The pair of inner rings 8, 8 are sandwiched between the shoulder portion 1a and the shoulder portion 20 of the outer joint member 15 on the cylindrical portion 1b of the wheel hub 1, via a predetermined interference. Furthermore, a predetermined bearing pre-pressure is applied to the wheel bearing by fastening a securing nut 4 on the male thread 21b. This increases the bearing rigidity and improves the life of the rolling fatigue of the bearing.

The outer member 7 and the inner ring 8 are formed from pipe member formed from bearing steel such as SUJ 2, or blister steel such as SCr 420 or SCM 415 by a pressing or cold rolling process (hereinafter referred to "plastic deformation process"). The SUJ 2 is heat treated by dipping quenching or high frequency induction quenching and the blister steel is heat treated by carburizing quenching to have a surface hardness of 50-64 HRC. Other members may be used for the outer member 7 and the inner ring 8 such as SCM 440, cold rolled steel plate (JIS SPCC family) or carbon steels such as S53C. In case of the cold rolled steel plates or carbon steels, at least double row outer raceway surfaces 7a, 7a of the outer member 7 and at least inner raceway surface 8a of the inner ring 8 are hardened by the high frequency induction quenching to have a surface hardness of 50-64 HRC. This improves the rolling fatigue life. If necessary, the outer and inner raceway surfaces are ground or super finished to have a predetermined dimension and accuracy.

The structure of the outer member 7 and the inner ring 8 will be described in detail with reference to FIG. 3.

As shown in FIG. 3(a), the outer member 7 is made by plastically deforming a pipe member. The outer member 7 has, on its inner circumference, a radially inwardly projecting annular projection 12 and double row outer raceway surfaces 7a, 7a. Each raceway surface 7a, 7a has a circular arc cross-section. Both ends include cylindrical portions 13, 13 to receive the seals 11. The double row outer raceway surfaces 7a, 7a and the cylindrical portions 13 are ground after the plastic deforming process. They have a predetermined dimension and accuracy. Burrs that would be generated on both end faces can be removed by a turning process. If necessary, any portion of the outer member may be ground.

During plastic deformation of the outer member 7, the inner circumferential surface of the annular projection 12 is formed with a flat configuration. This provides a proper height of the shoulder of the annular projection 12 from the outer raceway surface 7a. In addition an axially central portion of the outer member 7 is recessed so as to promote the material of the outer member 7 to be filled into the shoulder portion 22.

The inner ring 8 is made by plastically deforming a pipe member. The inner ring 8 has, on its outer circumference, the inner raceway surface 8a and a shoulder portion 14 axially extending from the inner raceway surface 8a as shown in FIG. 3(b). The shoulder portion 14 forms a seal land portion for a seal 11. Thus, it is ground simultaneously with the inner raceway surface 8a after the plastic deforming process to have predetermined dimensions and accuracy. Similarly to the outer member 7, both ends where burrs may be generated during the plastic deforming process can be turned after the plastic deforming process and ground, if necessary.

The outer member 7 and the inner ring 8 are made by plastically deforming a pipe member. The outer and inner raceway surfaces 7a, 8a and the cylindrical portions 13 of the outer member 7 where seals 11 are fit as well as the shoulder portion 14 of the inner ring 8, forming the land portion of the seals 11, are ground. Thus, it is possible to improve the productivity and yield of the wheel bearing. This reduces the manufacturing cost as well as assures the same accuracy and sealability of the wheel bearing as those of conventional wheel bearing.

When the annular projection 12 is formed by a plastic deforming process, the radius of curvature R of the shoulder portion 22, connecting the outer raceway surface 7a and the annular projection 12 is not necessarily small. Thus, this achieves the fill of material and suppresses the generation of cracks. Accordingly, a range to be ground is limited when the outer raceway surface 7a is ground. Thus, according to the present disclosure, the height H of the inner circumferential surface of the annular projection 12 from the bottom surface of the outer raceway surface 7a is set so that the height H is in a predetermined range during the plastic deforming process. More particularly, when the diameter of the ball 10 is denoted by Dw, a value of the shoulder height H divided by the diameter Dw of the ball 10 (i.e. H/Dw) is set within a range of 0.30~0.43, preferably 0.35~0.40. This makes it possible to assure a desirable bearing accuracy, to prevent the generation of cracks in the shoulder of the raceway surfaces, and also to prevent the contact ellipse of the ball 10 from riding over the shoulder 22 when a turning moment is applied to the bearing.

It is believed that the contact ellipse of the ball 10 would ride over the shoulder 22 when a turning moment is applied to the bearing under an ordinal contacting angle of 25~35° if the value of H/Dw is less than 0.30. If the drawing ratio in the plastically deforming process is increased, cracks would tend to be caused in the shoulder portion 22 if the value of H/Dw exceeds 0.43.

Although it is preferable to form the outer member 7 and the inner ring 8 by a cold rolling process, they may be formed by a warm rolling process. In addition, it is possible to conduct a grinding process to form the outer circumferential surface of the outer member 7 and the inner circumferential surface of the inner ring 8 that form fit against the knuckle 6 and the wheel hub 1, as well as the end face 8b of a smaller diameter side of the inner ring 8 that forms the abutting surface.

The shoulder portion 22 connecting the outer raceway surface 7a and the annular projection 12 is ground after heat treatment. A formed grinding wheel 23 simultaneously grinds the shoulder portion 22 with the outer raceway surface 7a. The shoulder portion 22, after the plastically deforming process, is shown by a two-dotted chain line in FIG. 4(a). The formed grinding wheel 23 is previously formed by a rotary dresser so that it has a small diameter portion 23a, formed so as not to contact the annular projection 12, a groove portion 23b, corresponding to the outer raceway surface 7a, and a corner portion 23c, corresponding to the shoulder portion 22. The corner portion 23c is formed with a circular arc cross-section of a predetermined radius of curvature R smoothly extending from the groove portion 23b. This makes it possible to assure a desirable bearing accuracy and to prevent the generation of cracks in the shoulder 22 of the raceway surfaces. Also, it is possible to prevent the contact ellipse of the ball 10 from riding over the shoulder 22 and causing the edge load when a turning moment is applied to the bearing. Accordingly, it is possible to provide a wheel bearing with an improved durability.

The formed grinding wheel 23 may be modified so that it can simultaneously grind the double row outer raceway surfaces 7a, 7a and their shoulder portions 22. The formed grinding wheel 23 is provided with double row groove portions 23b, 23b corresponding to the double row outer raceway surfaces 7a, 7a (not shown). This makes it possible to reduce the manufacturing steps and costs, and to limit erroneous difference within a predetermined accuracy in the groove diameters of the double row outer raceway surfaces and the pitch therebetween. Thus, this further improves the bearing accuracy.

FIG. 4(b) illustrates a modification of the formed grinding wheel of FIG. 4(a). In this outer member 24, the inner circumference of an annular projection 25 is formed by rolling so that it has a small step δ relative to the shoulder portion 26. The shoulder portion 26 is ground after heat treatment by the formed grinding wheel 27 simultaneously with the outer raceway surface 7a. The formed grinding wheel 27 is previously formed by a rotary dresser so that it has a small diameter portion 27a, formed so as not to contact the annular projection 25, a groove portion 27b, corresponding to the outer raceway surface 7a, and a corner portion 27c, corresponding to the shoulder portion 26. The corner portion 27c is formed with a circular arc cross-section of a predetermined radius of curvature R smoothly extending from the groove portion 27b to the small diameter portion 27a. This makes it possible to prevent the generation of cracks in the shoulder 26 of the raceway surfaces. This suitably assures the shoulder height of the annular projection 25 relative to the outer raceway surface 7a with filling material in the shoulder portion 26. Also, this eliminates an edge of the shoulder portion 26. Thus, it prevents the contact ellipse of the ball 10 from riding over the shoulder 26 and causing the edge load when a turning moment is applied to the bearing.

Although it is described that the outer member 7 (24) and the inner ring 8 are formed by cold rolling, they may be formed by warm rolling. In addition, it is possible to conduct a grinding process to form the outer circumferential surface of the outer member 7 and the inner circumferential surface of the inner ring 8, forming fitting surfaces against the knuckle 6 and the wheel hub 1, as well as the end face 8b of smaller diameter side of the inner ring 8, forming the abutting surface. This assures the same bearing accuracy as that of a bearing formed by forging and cutting.

Figure 5:
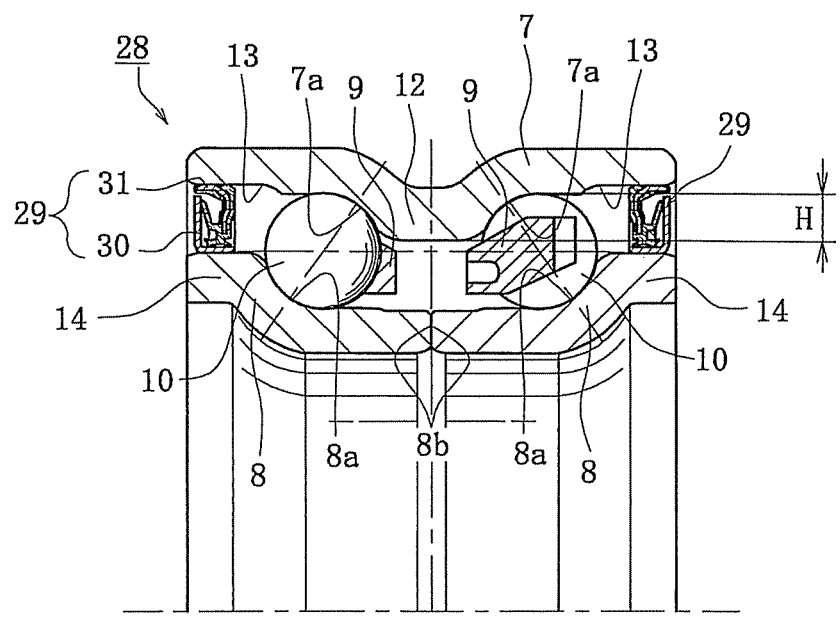
FIG. 5(a) is an enlarged view of a modification of the wheel bearing of FIG. 2.
FIG. 5(b) is a partially enlarged view of the seal of FIG. 5(a).
Figure 5:
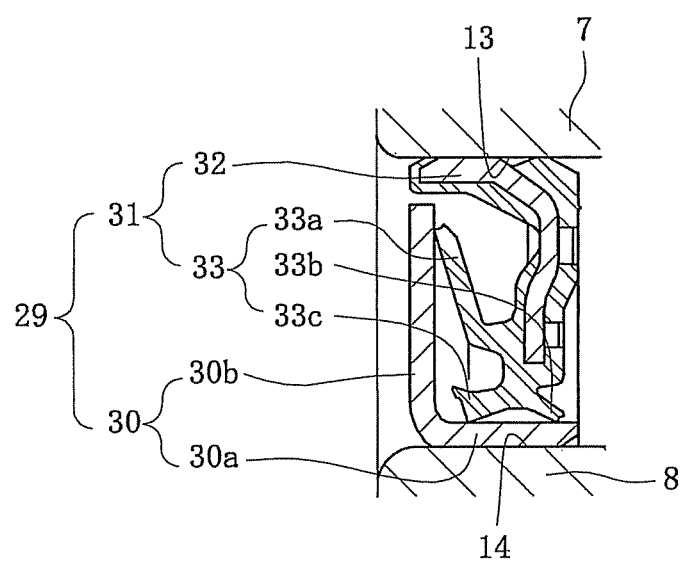

FIG. 5(a) shows a modification of the wheel bearing of previous embodiment (FIG. 2). The difference is only in the structure of the seals. The same reference numerals are used herein to identify the same structural elements of this modification as those of the previous embodiment.

A wheel bearing 28 includes an outer member 7, a pair of inner rings 8, 8, double row balls 10, 10 freely rollably contained between outer and inner raceway surfaces and held by cages 9, 9, and seals 29 mounted in annular openings formed between the outer member 7 and the inner ring 8.

Each seal 29 is formed as a so-called pack seal including a slinger 30 and annular sealing plate 31 arranged opposite toward each other as shown in an enlarged view of FIG. 5(b). The slinger 30 is made by a pressing process by pressing austenitic stainless steel sheet (JIS SUS 304 etc) or preserved cold rolled sheet (JIS SPCC etc). It has a substantially L-shaped cross-section with a cylindrical portion 30a, press fit onto the shoulder portion 14 of the inner ring 8, and a standing portion 30b, extending radially outward from the cylindrical portion 30a.

The sealing plate 31 is formed with a cross-section of substantially L-shaped configuration. The sealing plate 31 has a core metal 32 and a sealing member 33 integrally adhered to the core metal via vulcanized adhesion. The core metal 32 is made by a pressing process from austenitic stainless steel sheet (JIS SUS 304 etc) or preserved cold rolled sheet (JIS SPCC etc).

The sealing member 33 is made from an elastic material such as nitrile rubber and includes a side lip 33a. The slide lip 33a slidably contacts the standing portion 30b of the slinger 30. Two radial lips 33b, 33c slidably contact the cylindrical portion 30a. A labyrinth seal is formed between the outer circumference of the standing portion 30b of the slinger 30 and the core metal 32 to prevent rain water or dusts from entering from the outside and directly depositing on the side lip 33a.

The outer raceway surface 7a and the cylindrical portion 13 of the outer member 7, forming the fitting surface of the seal 29, and the inner raceway surface 8a and the shoulder 14 of the inner ring 8 are formed by a grinding process. Thus, it is possible to improve the productivity and yield of the wheel bearing. Also, it is possible to reduce the manufacturing cost as well as to assure the same accuracy and sealability of the wheel bearing as those of conventional wheel bearing.

Figure 6:
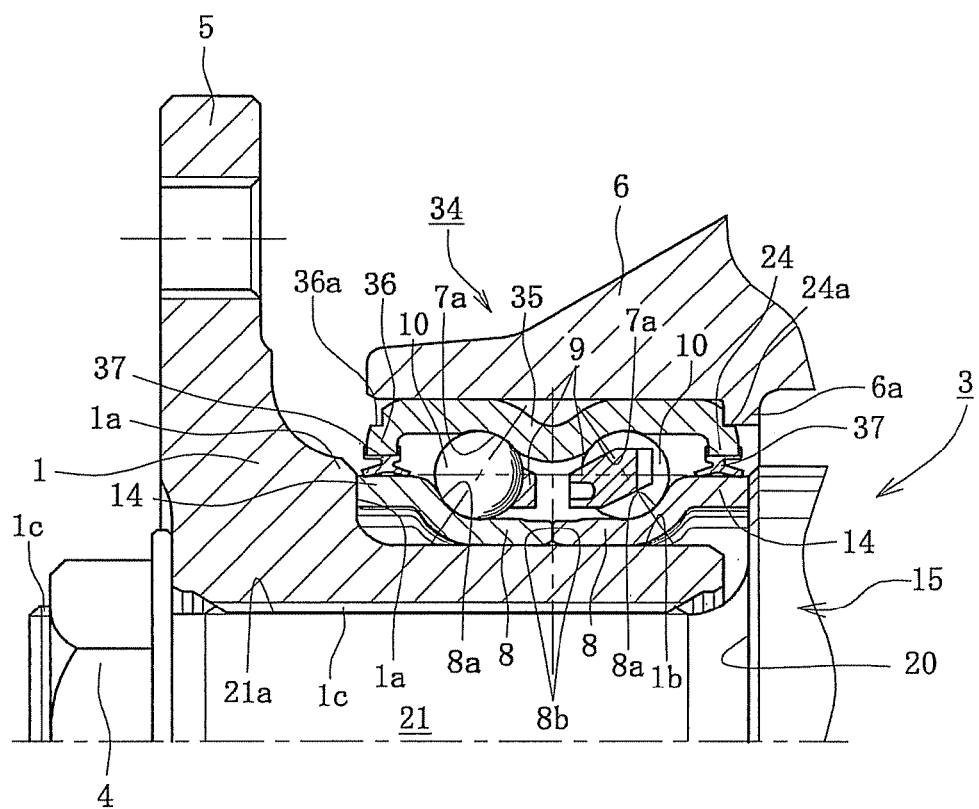
FIG. 6 is a longitudinal section view of a second embodiment of the vehicle wheel bearing apparatus.

FIG. 6 is a longitudinal section view of a second embodiment of a vehicle wheel bearing apparatus. Since this embodiment is different from the first embodiment only in the structure of the outer member and the seals, the same reference numerals as those used in the first embodiment are also used in this embodiment and thus the detailed description of them will be omitted.

The wheel bearing apparatus of FIG. 6 is formed as a structure of the first generation type. It has a wheel hub 1 and a wheel bearing 34 mounted on the wheel hub 1. The wheel bearing 34 includes an outer member (outer ring) 35 formed, on its inner circumference, with double row outer raceway surfaces 7a, 7a. A pair of inner rings 8, 8 formed, on their outer circumference, with double row inner raceway surfaces 8a, 8a are adapted to be arranged opposite to the outer raceway surfaces 7a, 7a. Double row balls 10, 10 are freely rollably held by cages 9, 9 between the outer and inner raceway surfaces 7a, 7a and 8a, 8a.

The outer member 35 is a pipe member formed from bearing steel such as SUJ 2 or blister steel such as SCr 420 or SCM 415 including a relatively small amount of carbon by a cold rolling process. The outer member 35 is formed, on its inner circumference, with a double row outer raceway surfaces 7a, 7a and, on its outer ends, with shoulder portions 36 extending radially inward. Elastomeric seals 37, 37 are integrally adhered on the shoulder portions 36, via vulcanized adhesion. Steps 36a are formed on the shoulder portion 36, to position the outer member 35 relative to a flange portion 6a of a knuckle 6.

According to this embodiment, seals 37 are integrally adhered to the shoulder portions 36 of the outer member 35. The seals 37 slidably contact the shoulder portions 14 of the inner rings 8 to prevent leakage of grease contained in the bearing and the entry of rain water or dusts from the outside. This makes it possible to reduce the number of components and steps of assembly of the wheel bearing. Thus, this reduces the manufacturing cost.

Figure 7:
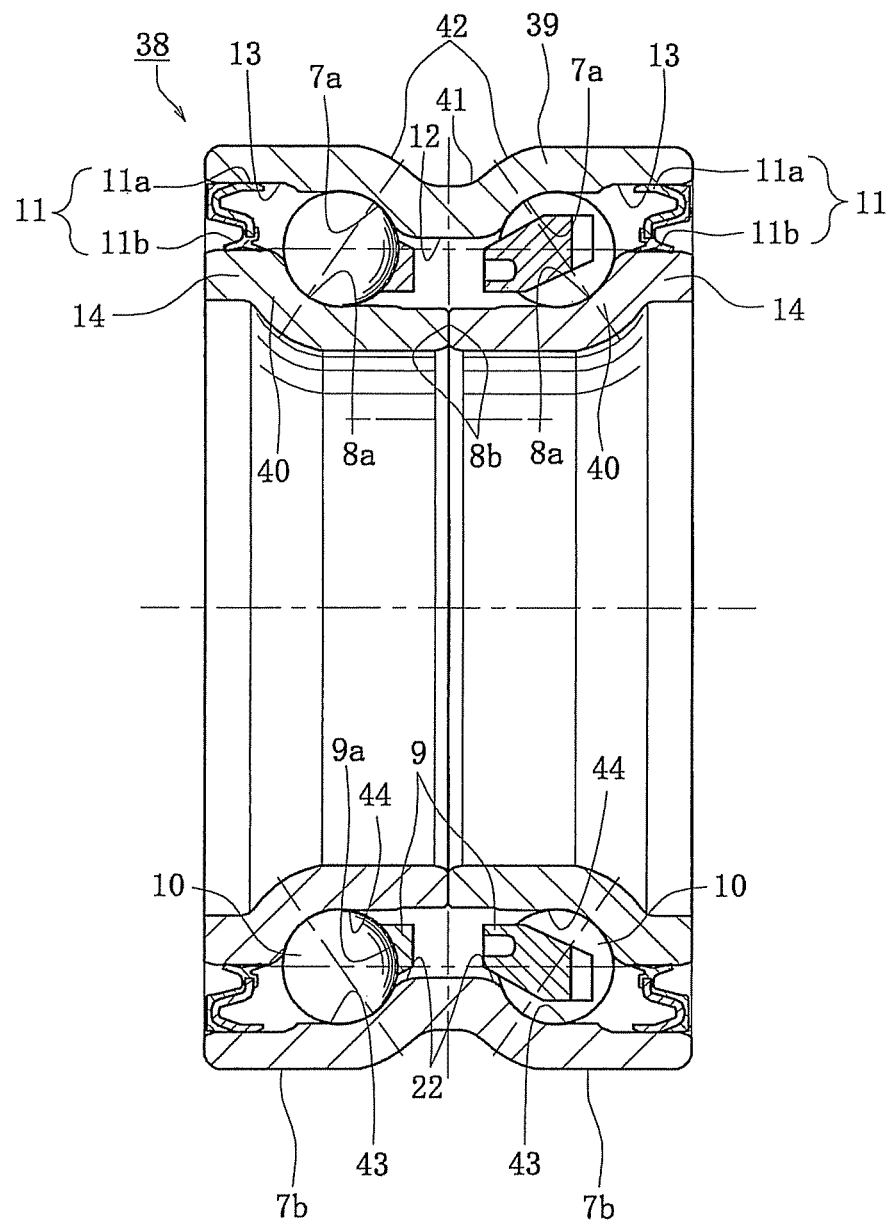
FIG. 7 is a longitudinal section view of a third embodiment of the vehicle wheel bearing.

FIG. 7 is a longitudinal section view of a third embodiment of a wheel bearing apparatus. FIG. 8(a) is a longitudinal section view of an outer ring only of FIG. 7. FIG. 8(b) is a partially enlarged view of FIG. 8(a). FIG. 9(a) is longitudinal section view of an inner ring only of FIG. 7. FIG. 9(b) is a partially enlarged view of FIG. 9(a). The same reference numerals are used in this embodiment to designate the same components and their parts as those used in the previous embodiments.

The wheel bearing 38 of this embodiment includes an outer member 39, formed on its inner circumference, with double row outer raceway surfaces 7a, 7a. Each outer raceway surface 7a has a circular arc cross-section. A pair of inner rings 40, 40 is formed, on their outer circumferences, with inner raceway surfaces 8a, 8a. Each inner raceway surface 8a has a circular arc cross-section and is arranged opposite to one of the double row outer raceway surfaces 7a, 7a. Double row balls 10, 10 are contained between the outer and inner raceway surfaces 7a, 7a and 8a, 8a. The balls are rollably held by cages 9, 9. Seals 11 are mounted on both ends of the outer member 39. The cages 9 are made of plastic resin such as PA (polyamide) 66 by injection molding. It is formed a so-called snap-on type for holding balls 10 in pockets 9a with spherically recessed surfaces to prevent the balls 10 from radially slipping off. The smaller diameter end faces 8b, 8b of the inner rings 40, 40 abut against each other to form a double row angular contact ball bearing of a so-called back-to-back duplex bearing.

Each of the seals 11 includes a metal core 11a adapted to be fit into the cylindrical portion 13 formed on the end of the outer member 7. An elastomeric sealing member 11b, such as nitrile rubber, with a pair of radial lips, is integrally adhered to the metal core 11a, via vulcanized adhesive. The seals 11 prevent leakage of grease contained within the bearing and the entry of rain water or dusts from the outside. The seal 11 is not limited to the illustrated integrated seal and may be a so-called pack seal with an annular sealing plate and a slinger arranged opposite toward each other and mounted on the cylindrical portion 13 of the outer member 7 and on the outer circumference of the inner ring 8.

The outer member 39 and the inner ring 40 are formed by plastically deforming pipe members formed from bearing steel such as SUJ 2 or blister steel such as SCr 420 or SCM 415. The SUJ 2 is heat treated by dip quenching or high frequency induction quenching. The blister steel is hardened by carburizing quenching. They have a surface hardness of 50-64 HRC. Other members may be used for the outer member 39 and the inner ring 40, such as blister steel such as SCM 440, cold rolled steel plate (JIS SPCC family) or carbon steels such as S53C.

In the case of the cold rolled steel plates or carbon steels, at least the double row outer raceway surfaces 7a, 7a of the outer member 39 and at least the inner raceway surface 8a of the inner ring 40 are hardened by the high frequency induction quenching to have a surface hardness of 50-64 HRC. This improves the rolling fatigue life. If necessary, the outer and inner raceway surfaces 7a, 8a are ground or super finished to have predetermined dimensions and accuracy.

Figure 8:
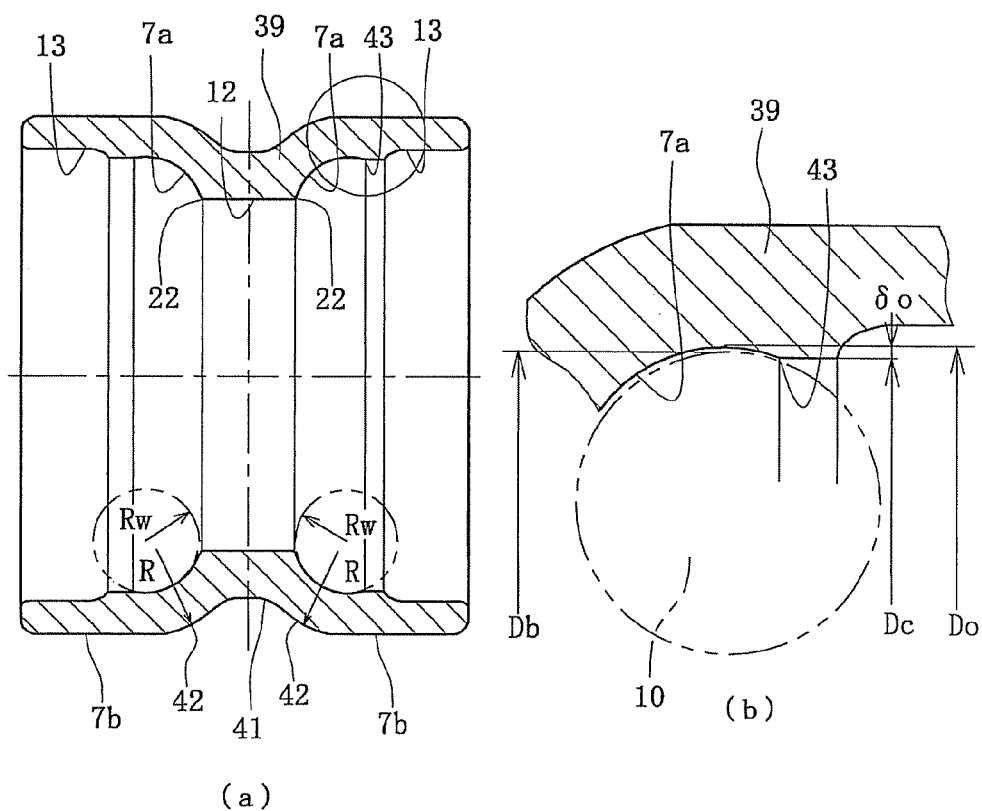
FIG. 8(a) is a longitudinal section view of an outer ring only of FIG. 7.
FIG. 8(b) is a partially enlarged view of FIG. 8(a).
Figure 9:
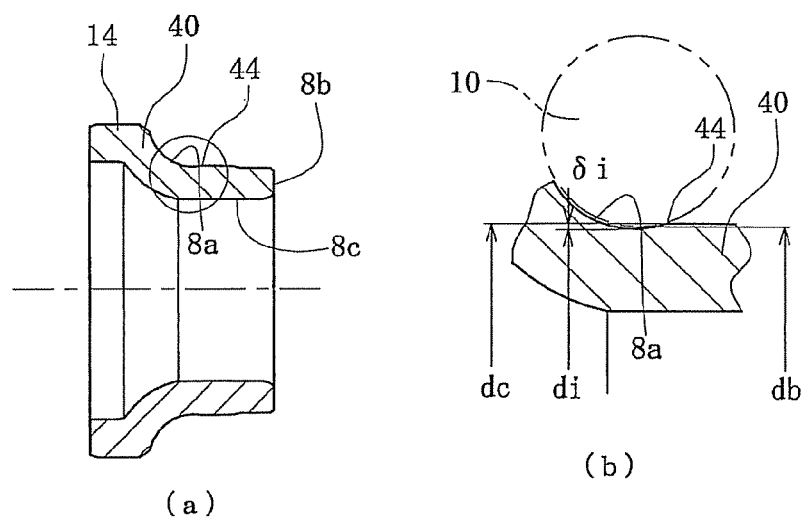
FIG. 9(a) is a longitudinal section view of an inner ring only of FIG. 7.
FIG. 9(b) is a partially enlarged view of FIG. 9(a).

The structure of the outer member 39 and the inner ring 40 will be described in detail with reference to FIGS. 8 and 9.

As shown in FIG. 8(a), the outer member 39 is made by plastically deforming a pipe member. Its inner circumference has a radially inwardly projecting annular projection 12 and double row outer raceway surfaces 7a, 7a, each with a circular arc cross-section. Both ends include cylindrical portions 13, 13 on which the seals 11 are fit. The double row outer raceway surfaces 7a, 7a and the cylindrical portions 13 are ground after the plastic deforming process to have predetermined dimensions and accuracy. This enables the wheel bearing to have the same accuracy and sealability as those of conventional bearings. Burrs that may be generated on both end faces during the plastic deforming process can be removed by a turning process. If necessary, any portion of the outer member may be ground.

During plastic deformation of the outer member 39, the inner circumferential surface of the annular projection 12 is formed with a flat configuration. This provides a proper height of the shoulder of the annular projection 12 from the outer raceway surface 7a. In addition, an axially central portion of the outer member 39 is recessed to promote the material of the outer member 39 to fill in the shoulder portion 22.

In this embodiment, the radius of curvature R of a transition portion (connecting portion) 42 between the outer circumference 7b of the outer member 39 and the annular recess 41 are set so that they are within a predetermined range. More particularly, when the radius of the ball 10 is denoted as Rw, the radius of curvature R is set within a range of 1.5~1.8 Rw. This makes it possible to make the wall thickness of this portion substantially uniform. This prevents the generation of cracks in the shoulder 22 of the raceway surfaces. Furthermore, it is also possible to assure an appropriate shoulder height to prevent the contact ellipse of the ball 10 from riding over the shoulder 22 and causing an edge load when the turning moment is applied to the bearing. Thus, it is possible to provide a wheel bearing 38 having an improved durability. The term "substantially uniform" means uniform wall thickness of a pipe member prior to its deformation. A wall thickness obtained after deformation without causing plastic flowing of material except for forming a circular arc cross-section in the transition portion 42. Accordingly, it should be understood that the term "substantially uniform" also includes conditions of slight thin and thick wall thickness caused by displacement of material during formation of the circular arc cross-section in the transition portion 42.

If the wall thickness is too small, the rigidity is reduced. Accordingly, the bearing could not resist against stress caused by a turning moment of vehicle when the radius of curvature R is less than 1.5 Rw. On the contrary, if the wall thickness is too large, workability of the plastically deforming process would be reduced and accordingly the outer member would be heavy and large like those of a conventional forged outer member when the radius of curvature R is larger than 1.8 Rw.

In addition as shown in FIG. 8(b), a counter portion 43 is formed at a position opposed to the shoulder 22 of the outer raceway surface 7a by a plastic deforming process simultaneously with the formation of the outer raceway surface 7a. The inner diameter Dc of the counter portion 43 is set so that it is smaller than the groove bottom diameter Do by 2δo (i.e. Dc=Do−2δo). That is, the inner diameter Dc of the counter portion 43 is set smaller than the circumscribed circle diameter Db of the balls 10 in the ball cassette (Dc<Db). Thus, this prevents the ball cassette from slipping off from the outer member 39. In this case, it is of course that radially shifting amount of balls 10 held within the pockets of the cages 9 is included in the circumscribed circle diameter Db. This makes it possible to surely prevent the ball cassette once assembled in the assembly step from dropping off from the outer member 39. Thus, this simplifies the assembly of the wheel bearing.

In addition, it may be possible, after heat treatment, to grind the counter portion 43 of the outer member 39 simultaneously with the outer raceway surfaces 7a by using a formed grinding wheel. This makes it possible to further finely finish the inner circumference Dc of the counter portion 43 while eliminating deformation caused by heat treatment. This suppresses the generation of scratches on balls 10 that would be caused by the passage of balls through the counter portion, It provides a wheel bearing 38 with high quality and reliability.

The inner ring 40 is made by plastically deforming a pipe member. Its outer circumference includes inner raceway surface 8a with a circular arc cross-section and a shoulder portion 14 axially extending from the inner raceway surface 8a, as shown in FIG. 9(a). The shoulder portion 14 forms a seal land portion for the seal 11. The shoulder portion 14 is ground simultaneously with the inner raceway surface 8a after the plastic deforming process to have predetermined dimensions and accuracy. Similarly to the outer member 39, both ends on which burrs may be generated during the plastic deforming process can be turned after the plastic deforming process and, if necessary, ground.

As shown in an enlarged view of FIG. 9(b), a counter portion 44 is formed at a position opposed to the shoulder 14 of the inner raceway surface 8a by a plastic deforming process simultaneously with the formation of the inner raceway surface 8a. The outer diameter dc of the counter portion 44 is set so that it is larger than the groove bottom diameter di by 2δi (i.e. dc=di+2δi). That is, the outer diameter dc of the counter portion 44 is set larger than the inscribed circle diameter db of the balls 10 in the ball cassette (dc>db). Thus, this prevents the ball cassette from slipping off from the inner ring 40. In this case, it is of course that radially shifting amount of the balls 10 held within the pockets of the cages 9 is included in the inscribed circle diameter db. This makes it possible to surely prevent the inner rings 40 once assembled in the assembly step, from axially dropping off and thus simplifies the assembly of wheel bearing.

In addition, similar to the outer member 39, it may be possible, after heat treatment, to simultaneously grind the counter portion 44 of the inner ring 40 with the inner raceway surfaces 8a by using a formed grinding wheel. This makes it possible to further finely finish the outer circumference dc of the counter portion 44 while eliminating deformation caused by heat treatment. This suppresses the generation of scratches on balls 10 that would be caused by passage of balls through the counter portion. This provides a wheel bearing 38 having high quality and reliability.

In this case, it may be possible to form, by a grinding process, the outer circumference 7b of the outer member 7 and the inner circumference 8c of the inner ring 40 forming fitting surfaces of the knuckle 6 or the wheel hub 1, and the smaller diameter side end face 8b forming its abutting surface. This makes it possible to assure substantially the same bearing accuracy as a conventional bearing made by forging and cutting.

Figure 10:
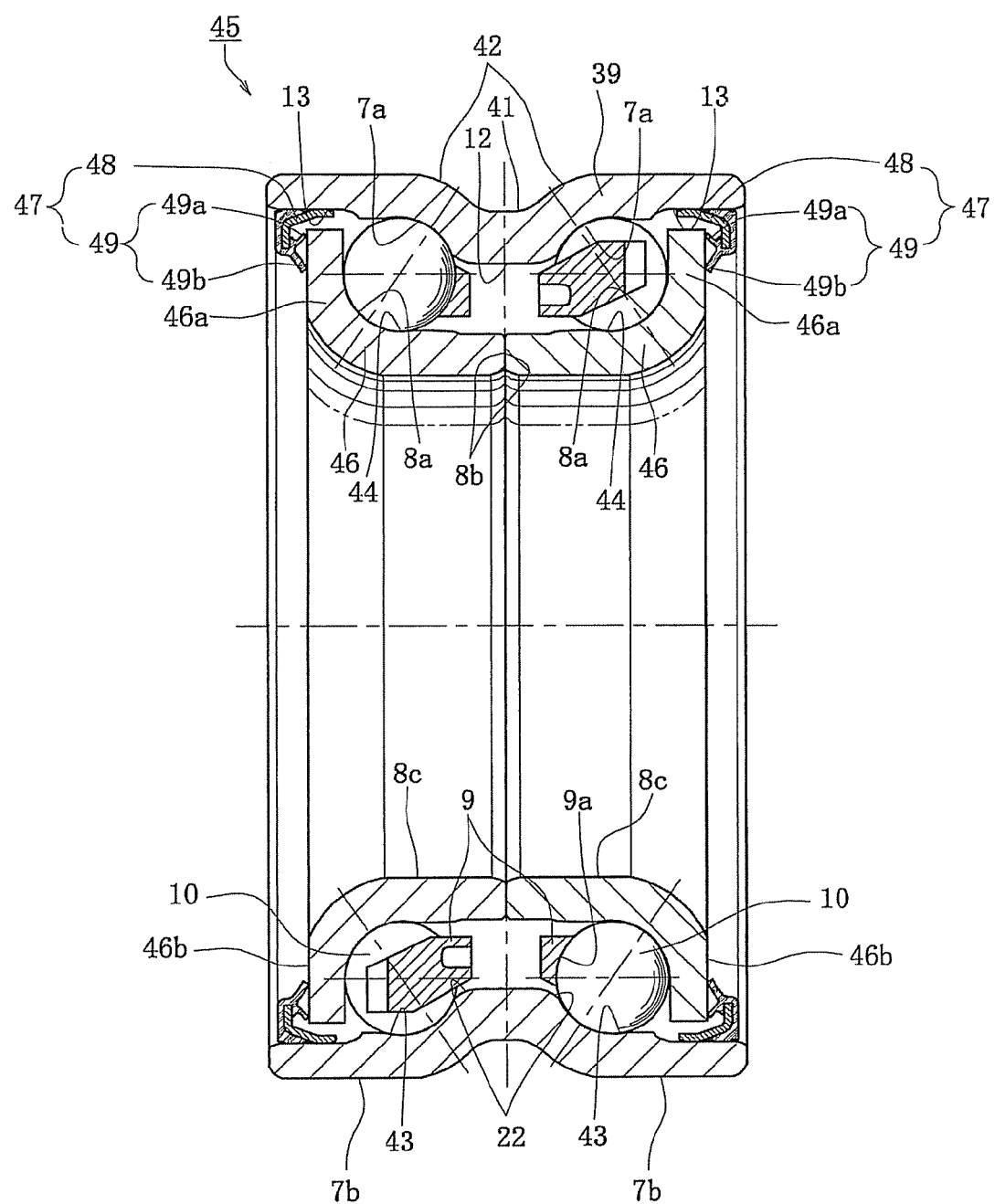
FIG. 10 is a longitudinal section view of a fourth embodiment of the vehicle wheel bearing.
Figure 11:
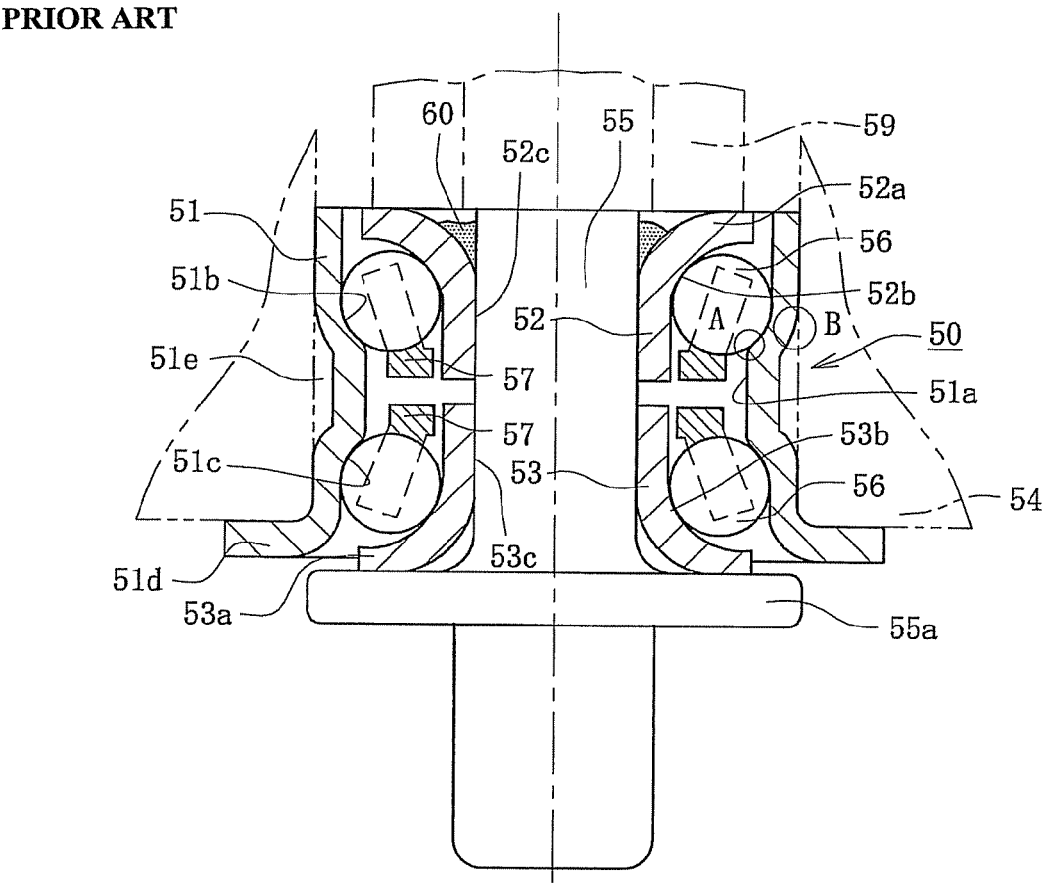
FIG. 11 is a longitudinal section view of a prior art angular contact ball bearing with the inner and outer rings formed by a pressing process.

FIG. 10 is a longitudinal section view of a fourth embodiment of the vehicle wheel bearing apparatus. Since this embodiment is different from the previous embodiments only in the structure of the inner ring and the seals, the same reference numerals as those used in the previous embodiments are also used in this embodiment and thus the detailed description of them will be omitted.

The wheel bearing 45 includes an outer member (outer ring) 39 formed on its inner circumference with double row outer raceway surfaces 7a, 7a. A pair of inner rings 46, 46 formed, on their outer circumference, with double row inner raceway surfaces 8a, 8a are adapted to be arranged opposite to the outer raceway surfaces 7a, 7a. Double row balls 10, 10 are freely rollably held by cages 9, 9 between the outer and inner raceway surfaces 7a, 7a and 8a, 8a. Seals 47, 47 are mounted on both ends of the outer member 7. The inner rings 46, 46 are arranged with their smaller diameter end faces 8b, 8b abutting one another to form an angular contact ball bearing of a so-called back-to-back duplex bearing.

Each seal 47 includes a metal core 48 adapted to be fit into the cylindrical portion 13 of the outer member 39. An elastomeric sealing member 49, such as nitrile rubber, with a pair of side lips 49a, 49b is adhered to the metal core 48 via vulcanized adhesion. The side lips 49a, 49a can elastically contact larger diameter side end faces 46b of the inner rings 46 and effectively prevent leakage of lubricating grease sealed within the wheel bearing and the penetration of rain water or dusts from the outside of the bearing apparatus. Also, they prevent the inner ring 46 from axially slipping off.

Similarly to the previous embodiment, the wheel bearing 45 is adapted to be fit onto the wheel hub, via a predetermined interface, and applied a predetermined bearing pre-pressure. The larger diameter side end faces 46b of the inner rings 46 abuts against the shoulder portions of the outer joint member and the wheel hub. The pair of the inner ring 46, 46 is sandwiched therebetween.

The inner ring 46 is formed from a pipe member formed of bearing steel such as SUJ 2 or blister steel such as SCr 420 or SCM 415 by a plastic deforming process. Then SUJ 2 is heat treated by dipping quenching or high frequency induction quenching. The blister steel is heat treated by carburizing quenching. They have a surface hardness of 50-64 HRC.

The inner ring 46 is formed on its outer circumference with an inner raceway surface 8a with a circular arc cross-section. A shoulder portion 46a extends radially outward from the inner raceway surface 8a. The outer diameter of the shoulder portion 46a is larger than the PCD of the balls 10. Thus, it is possible to prevent the balls from riding over the shoulder even though a large moment load is applied to the bearing. Thus, this improves the durability of the bearing. In this case a side face of the shoulder portion 46a and the end face 46b of the larger diameter side form the seal land portion of the seal 47. It is ground after a plastic deforming process. This makes it possible to remove burrs generated during the plastic deforming process and to obtain predetermined dimensions, accuracy and surface roughness.

A counter portion 44 is formed by a plastic deforming process at a position opposite to the shoulder portion 46a of the inner raceway surface 8a. The counter portion 44 is simultaneously formed with the formation of the inner raceway surface 8a. This prevents axial slip-off of the inner rings 46 during the assembly step prior to mounting of the seals 47 or even during transportation of the wheel bearing.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The wheel bearing apparatus can be applied to wheel bearing apparatus of the first generation type with a wheel hub having a wheel mounting flange integrally formed at one end, and a pair of inner rings press fit onto the wheel hub.

What is claimed is:

1. A vehicle wheel bearing forming a double row angular contact ball bearing of a back-to-back duplex bearing type comprising:
    a first pipe member formed into an outer member to fit into a suspension knuckle, and on its inner circumference, the outer member has a radially inwardly projecting annular projection and double row outer raceway surfaces, the inner circumferential surface of the annular projection is formed with a flat configuration, each outer raceway surface has a circular arc cross-section and both ends of the outer member include circular cylindrical surface portions to receive seals;
    a second and third pipe member formed into a pair of inner rings, each inner ring has, on its outer circumference, an inner raceway surface formed in a circular arc shape arranged opposite to one of the outer raceway surfaces, a shoulder portion axially extending from a larger diameter side of the inner raceway surface, and a smaller diameter side end face axially extending from a smaller diameter side of the inner raceway surface, the end of the smaller diameter side of one inner ring abutting against the end of a smaller diameter side of the other inner ring;
    double row balls contained between the outer and inner raceway surfaces, respectively, of the outer member and inner rings, said balls held by cages;
    said seals mounted against ground surfaces in annular openings formed between the outer member and inner rings;
    the outer member and the inner rings are plastically deformed first, second and third pipe members with the first, second and third pipe members having a substantially uniform wall thickness; and
    each circular cylindrical surface portion extending outwardly from its respective outer raceway surface to form a seal land portion, the inner rings shoulder portions form a cylindrical circular surface that acts as seal land portions, the outer member seal land portions oppose the inner ring seal land portions forming fitting portions for the seals, and the seal land portions and raceway surfaces are both ground to have predetermined dimensions and accuracy to provide a desired surface to receive the seals and balls, respectively.

2. The wheel bearing of claim 1, wherein the outer member and the inner rings are made by a cold rolling process.

3. The wheel bearing of claim 1, wherein when the diameter of the ball is denoted by Dw, and the height of an annular projection from the bottom of the outer raceway surface of the outer member is denoted by H, a ratio H/Dw is set within a range of 0.30 to 0.43.

4. The wheel bearing of claim 1, wherein the cylindrical portions at both ends of the outer member are formed by a rolling process, the seals are fit into the cylindrical portions, and the shoulder portions of each inner ring are formed by the rolling process, sealing lips of the seals are in sliding contact with the surface of the shoulder of the inner rings.

5. The wheel bearing of claim 1, wherein each seal comprises a slinger and a sealing plate each having a substantially L-shaped cross-section and arranged opposite each other, each sealing plate comprises a side lip and radial lips, the cylindrical portions at both ends of the outer member are formed by the rolling process, the sealing plates are fit into the cylindrical portions, the shoulder portion of each inner ring is formed by the rolling process, the slingers are press fit onto the shoulders, and the sealing lips of each sealing plate slidably contacts the surface of the respective slinger.

6. The wheel bearing of claim 1, wherein radially inwardly extending shoulder portions are formed on both ends of the outer member by the rolling process, and the seals are integrally formed on the shoulders.

7. The wheel bearing of claim 1, wherein both end faces of the outer member and a larger diameter side end face of the inner ring are formed by a turning process after their plastic deformation process, and the outer and inner raceway surfaces, the outer circumferential surface of the outer member, the inner circumferential surface and smaller diameter side end face of the inner ring are ground to have predetermined dimensions and accuracy after heat treatment.

8. The wheel bearing of claim 1, wherein the outer circumference of an axially central portion of the outer member is annularly recessed to form said annular projection on its inner circumference with said flat surface on the radially innermost portion of the annular projection, and shoulders connecting each outer raceway surface and the annular projection are ground to have a circular arc cross-sections by a formed grinding wheel simultaneously with the grinding of the outer raceway surface.

9. The wheel bearing of claim 8, wherein the flat surface of the annular projection is formed by the rolling process to have a step relative to the shoulder of the annular projection.

10. The wheel bearing of claim 8, wherein the double row outer raceway surfaces are simultaneously ground by a formed grinding wheel.

11. The wheel bearing of claim 1, wherein a transition portion between the outer circumference and an annular recess of the outer member is formed with a circular arc cross-section of a predetermined radius of curvature and also has a substantially uniform wall thickness.

12. The wheel bearing of claim 11, wherein the radius of curvature R of the transition portion is set within a range of 1.5 to 1.8 Rw, wherein Rw is a radius of the ball.

13. The wheel bearing of claim 1, wherein the cages are formed by injection molding of plastic resin as snap-on type, the balls are held by the cages freely rollably without falling-out, and counter portions are formed by the plastically deforming process at positions opposite to the shoulders of the outer raceway surfaces.

14. The wheel bearing of claim 13 wherein the inner diameter of the counter portions is set smaller than the circumscribed circle diameter of balls where the balls are held by the cages.

15. The wheel bearing of claim 13, wherein a counter portion is formed by the plastically deforming process at a position opposite to the shoulder of each inner raceway surface, and the outer diameters of the counter portions are set larger than the inscribed circle diameter of the balls where the balls are held by the cages.

16. The wheel bearing of claim 13, wherein the counter portions are ground by a formed grinding wheel simultaneously with the grinding of the inner raceway surfaces after heat treatment.

17. The wheel bearing apparatus comprising a wheel hub integrally formed at one end with a wheel mounting flange and a cylindrical portion axially extending from the wheel mounting flange, via a shoulder portion, and a wheel bearing of claim 1 press fit onto the cylindrical portion of the wheel hub via a predetermined interference, the wheel hub abuts against the shoulder of the inner ring, an annular space is formed between an inner circumference of the inner ring and the wheel hub, an outer joint member of a constant velocity universal joint is fit into the wheel hub via a serration engagement, and the pair of inner rings are sandwiched between the shoulder portion of the wheel hub and a shoulder portion of the outer joint member with a predetermined bearing pre-pressure applied onto the wheel bearing.

\* \* \* \* \*

UNITED STATES PATENT AND TRADEMARK OFFICE
CERTIFICATE OF CORRECTION

Page 1 of 1

PATENT NO. : 9,200,669 B2
APPLICATION NO. : 12/572513
DATED : December 1, 2015
INVENTOR(S) : Torii It is certified that error appears in the above-identified patent and that said Letters Patent is hereby corrected as shown below:

In the claims

<u>Column 16</u>
Line 27, claim 1    delete "rings" insert --ring--

Signed and Sealed this
Nineteenth Day of April, 2016

Michelle K. Lee
*Director of the United States Patent and Trademark Office*